United States Patent [19]

Vollmann et al.

[11] Patent Number: 4,642,706
[45] Date of Patent: Feb. 10, 1987

[54] VIDEO CASSETTE RECORDER WITH IMPROVED TAPE GUIDING AND TENSIONING

[75] Inventors: Norbert Vollmann; Leopold Mader, both of Wiener Neudorf, Austria

[73] Assignee: U.S. Philips Corporation, New York, N.Y.

[21] Appl. No.: 706,209

[22] Filed: Feb. 27, 1985

[30] Foreign Application Priority Data

Apr. 25, 1984 [AT] Austria .................................. 1372/84

[51] Int. Cl.$^4$ .............................................. G11B 15/48
[52] U.S. Cl. ...................................... 360/74.3; 360/95
[58] Field of Search ........................... 360/95, 85, 74.3

[56] References Cited

U.S. PATENT DOCUMENTS

| | | | |
|---|---|---|---|
| 3,864,742 | 2/1975 | Katoh | 360/95 |
| 3,969,766 | 7/1976 | Tanaka et al. | 360/85 |
| 4,060,840 | 11/1977 | Umeda | 360/85 |
| 4,510,534 | 4/1985 | Maeda | 360/95 |

FOREIGN PATENT DOCUMENTS 0021822 2/1979 Japan .................................. 360/95

*Primary Examiner*—A. Michael Chambers
*Attorney, Agent, or Firm*—David R. Treacy

[57] ABSTRACT

A recording and/or reproducing apparatus (1) for a magnetic tape (3) that can be drawn out of a cassette (2) introduced into the apparatus is provided for wrapping the magnetic tape around a drum-shaped scanning device (15) of the apparatus with a tape guide device (29), which has at least one tape guide (32,33) which is displaceable by means of a displacement device (30) between a rest position and an operating position and which in its operating position is positioned by means of a positioning device (68) arranged on a displaceable support (70), while it keeps the magnetic tape (3) wrapped around the scanning device (15). For adjusting the tape tension when the magnetic tape (3) wrapped around the scanning device (15) is driven, the apparatus (1) is provided with a tape tension adjustment device (12) comprising a tape tension indicator. The tape guide (32,33) situated in its operating position is disengaged from the displacement device (30) for this guide and is kept urged against the positioning device (68) by means of an urging device (78) provided on the support (70) for the positioning device (68), while the support (70) for the positioning device at the same time constitutes the tape tension indicator of the tape tension adjustment device (12).

7 Claims, 11 Drawing Figures

VIDEO CASSETTE RECORDER WITH IMPROVED TAPE GUIDING AND TENSIONING

BACKGROUND OF THE INVENTION

The invention relates to a helical scan cassette recorder: that is, recording and/or reproducing apparatus for a magnetic tape which is accomodated in a cassette that can be introduced into the apparatus and can be drawn out of the cassette through an opening therein, comprising a drum-shaped scanning device for the magnetic tape, around the outer surface of which the magnetic tape drawn out of the cassette can be wrapped in a given angular range; a tape tension adjustment device which comprises a tape tension indicator, and serves to adjust the tape tension when the magnetic tape wrapped around the scanning device is driven; and a tape guide device which is adapted to draw the magnetic tape out of the cassette and to wrap it around the scanning device. Such a recorder used for television signals is commonly called a VCR. The guide device typically has at least one tape guide which is secured to a holder and can be displaced between a rest position and an operating position by means of a displacement device. In the rest position the guide engages behind the magnetic tape accomodated in the at the area of the cassette opening and in the operating position the magnetic tape taken along by the guide during its displacement is kept wrapped around the scanning device. The guide device includes a positioning device for positioning the tape guide in its operating position, which is arranged on a displaceable support subjected to the force of a spring.

Such a VCR is known, for example, from U.S. Pat. No. 4,060,840. In this apparatus, the tape tension adjustment device comprises as tape tension indicator a tape tension sensor lever. Upon displacement of the tape guide by means of the displacement device from its rest position into its operating position the sensor lever is pivoted while the displacement device takes the magnetic tape from an inactive position into an active position, in which a tape tension sensor pin secured to the tape tension sensor lever presses against a portion of the magnetic tape taken along by the tape guide. This requires a comparatively laborious and complicated construction. The magnetic tape is wrapped around the tape tension sensor over a comparatively small angular range, so that the tape tension indicator does not have to the desired high sensitivity. Furthermore, the tape tension sensor pin in the travel path of the tape cooperates with the magnetic tape at a comparatively large distance from the scanning device, while several guide and scanning members engage the magnetic tape and vary the tape tension between the tape tension sensor pin and the scanning device. Therefore with this tape tension indicator it is not possible to detect the actual tape tension of the magnetic tape in the immediate proximity of the scanning device, and to adjust the tension of the magnetic tape, especially at the area of the scanning device, by means of the tape tension adjustment device.

Adjustment of the tension of the magnetic tape at the area of the scanning device is of particular importance for perfect recording and/or reproducing operation by a scanning device of the type having at least one magnetic head. For positioning the tape guide in its operating position, the apparatus shown in the U.S. patent has a positioning device provided on a displaceable support, the displaceability of the support being utilized solely for positioning purposes. Due to this displaceability of the support, the positioning device provided on this support can be automatically adapted during a positioning operation to a further positioning device for positioning the holder for the tape guide.

SUMMARY OF THE INVENTION

The object of the invention is to provide the tensioning function described, in an apparatus of simple construction, in which the tape tension of the magnetic tape can be detected with great sensitivity and adjusted in a simple manner at the area of the drum-shaped scanning device.

In a helical scan cassette recorder according to the invention the displacement device for the tape guide, is constructed so that when the tape guide is in its operating position, the device can be disengaged from the guide an urging device urges the tape guide against the positioning device which is provided on the support. The guide is displaceable with respect to this support between a disengaged position and an urged position. The support constitutes the tape tension indicator of the tape tension adjustment device, and is arranged so as to be displaceable, substantially parallel to the longitudinal plane of symmetry of the freely extending magnetic tape section, immediately adjacent the scanning device. The tape tension is exerted by the magnetic tape on the tape guide when it is situated in its operating position and urged against the positioning device on the support against the force of the spring. Thus the tape guide, which is needed for wrapping the magnetic tape around the drum-shaped scanning device, is additionally utilized to detect the tape tension of the magnetic tape in its operating position because the guide is held in the positioning device on the support becomes by the urging device, the support fixedly connected to the tape guide in the operating position of the latter. This arrangement enables the support to constitute the tape tension indicator of the tape tension adjustment device. A separate tape tension indicator is not needed. This results in a considerable simplification and saving in space and in an increase of the reliability of the apparatus in use. The detection of the tape tension via the tape guide, which is located near the scanning device in order to keep the magnetic tape in its operating position wrapped around the scanning device, also affords the great advantage that the tape tension in the immediate proximity of the scanning device is detected by the tape guide. The tape tension is advantageously adjusted by the tape tension adjustment device in accordance with the detection result at the area of the scanning device. This is of major importance in achieving perfect recording and/or reproducing operation.

A further advantage is that the tape guide in its operating position is wrapped by the magnetic tape over a comparatively large angular range, thereby providing a high sensitivity of the tape tension indicator. Due to the disengagement of the tape guide in its operating position from the displacement device, the tape guide can follow all the tape tension variations without hindrance. Small tape tension fluctuations are readily detected by this tape tension indicator.

Due to the fact that the support is arranged so as to be displaceable substantially parallel to the longitudinal plane of symmetry of the freely extending magnetic tape section immediately adjacent the scanning device, the travel path of the magnetic tape at its level with respect to the scanning device remains unchanged during the tape tension adjustment operation. It should be noted that the tape tension indicator can be based on different principles; for example, it may be constructed as a photo-electric, magneto-electric or mechanical indicator.

The displacement device for the tape guide may be constituted, for example, by a lever arrangement. The connection of this lever arrangement with the holder of the tape guide is eliminated, when the tape guide is in its operating position, by a separate actuation device. It has proved advantageous that the displacement device for the tape guide have a ring for displacing the holder for the tape guide. The ring is adapted to be pivotably driven in a panel about the scanning device. The device includes a guide coaxial to the ring for guiding the holder during its displacement, the ring is provided with a slot extending through to the panel. A sliding rod is pivotably connected to the holder, a bent free end of this rod engaging the ring in the slot upon rotation of the ring to displace the tape guide to its operating position. The rod is slidably supported by the panel, and upon rotation of the ring for displacing the tape guide from its operating position is lifted off the panel and engage an abutment at the ring. The panel has a further slot which, when the tape guide is in its operating position, at least partly overlaps the slot in the ring, so that the holder can be detached from the guide.

For disengaging the displacement device from the tape guide when it is in its operating position and is urged against the positioning device on the support the bent free end of, the sliding rod drops into the two slots so as to be freely movable. Upon reverse pivoting of the ring 37, the bent end of the sliding rod is brought into engagement with the abutment end of the slot in the ring for coupling the displacement device with the tape guide upon displacement of the tape guide from its operating position, and the holder is then connected with the guide. As a result, a stable reliable displacement device with low friction is obtained, in which a simple and reliable disengagement of the device from the tape guide and also a simple coupling of the device with the tape guide are attained without the use of separate auxiliary means.

The urging device may be constituted, for example, by a slide mechanism which can be controlled by the displacement device and can be locked in its urged position. It has proved to be advantageous that the urging device be constituted by a dead center lever arrangement which can be automatically adjusted to its urged position upon displacement of the tape guide to its operating position and can be automatically adjusted from its urged position upon displacement of the tape guide from its operating position. Such a dead center lever arrangement advantageously has a simple construction and can be simply controlled by its automatic tilting.

In the travel path of the magnetic tape between the scanning device and the tape guide there may be arranged a tape guide element which cooperates with the magnetic tape, is fixedly arranged and ensures that the magnetic tape is continuously kept wrapped around the scanning device in the same given angular range independently of the displacement of the support and the tape guide fixed to this support in its operating position during the tape tension adjustment operation. Preferably the freely extending magnetic tape section immediately adjacent the scanning device extends to the tape guide, which is situated in its operating position and urged against the positioning device on the support. The support is constituted by a slide arranged so as to be displaceable in the longitudinal direction of this freely extending magnetic tape section. As a result, without the use of separate auxiliary means, the magnetic tape remains continuously wrapped in the same given angular range around the scanning device also during the tape tension adjustment operation.

In order that the invention may be readily carried out, it will now be described more fully with reference to the accompanying drawings, which show two embodiments, to which the invention is not limited.

DESCRIPTION OF THE PREFERRED EMBODIMENTS

Figure 1:
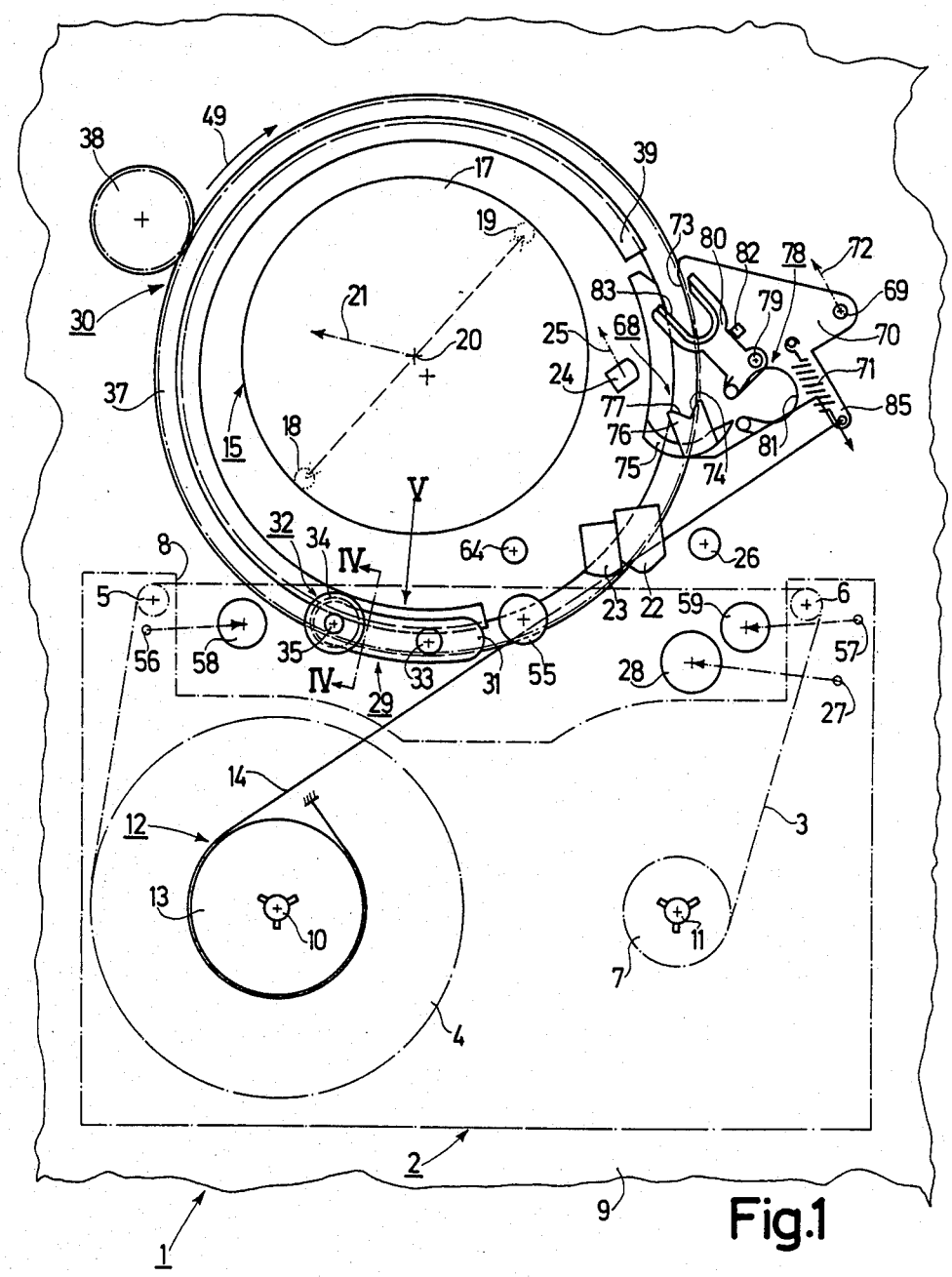
FIG. 1 is a diagrammatic plan view of the parts essential to the invention in a first VCR embodiment, in which a table supporting plate carrying a tape guide positioning device constitutes a mechanical tape tension indicator, the tape guides being shown in their rest position.
Figure 2:
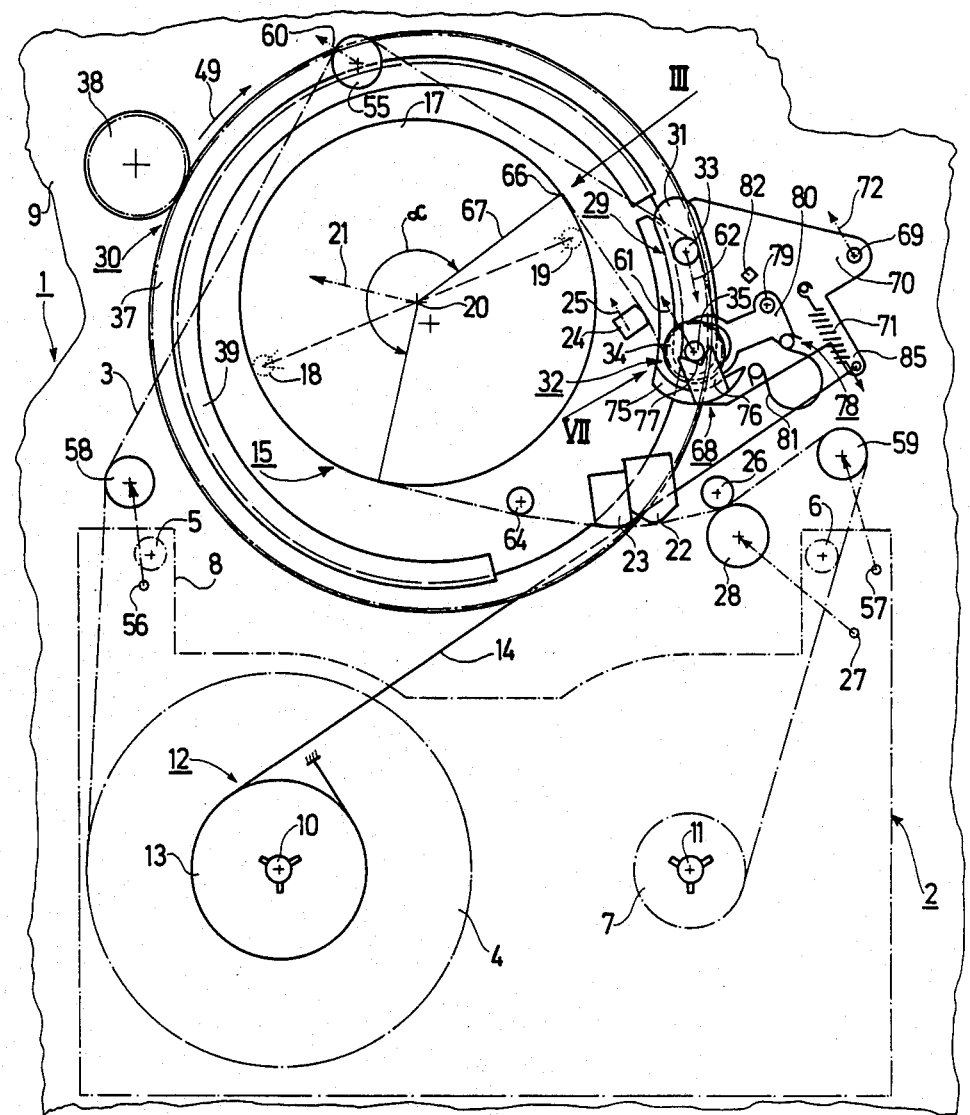
FIG. 2 shows in the same manner as FIG. 1 the same apparatus, with the tape guides being shown in their operating position.

A cassette 2 indicated diagrammatically by dot-and-dash lines can be introduced into the VCR 1 shown in FIGS. 1 and 2. This cassette accomodates a magnetic tape 3 which is guided inside the cassette from a first tape reel 4 over a first guide roller 5 and a second guide roller 6 to a second tape reel 7. The magnetic tape section extending between the two guide rollers 5 and 6 is stretched across an opening 8 of the cassette 2, through which the magnetic tape 3 can be drawn out of the cassette.

For driving the two tape reels 4 and 7, two winding mandrels 10 and 11 are rotatably journalled on a panel 9. The mandrels can be driven by a motor in a manner not shown. A tape tension adjustment device 12 cooperates with the winding mandrel 10. The adjustment device has a braking disk 13 connected coaxially to the winding mandrel 10 for rotation with the mandrel. A braking tape 14 engages the perimeter of the disc. The more firmly the braking tape 14 presses against the braking disk 13, the more strongly the magnetic tape running off the tape reel 4 is braked, as a result of which the tape tension of the magnetic tape increases. With decreasing braking effect of the braking tape 14 on the braking disk 13, the tape tension of the magnetic tape is reduced.

The VCR apparatus 1 comprises a drum-shaped scanning device 15, which is composed of a drum half 16 fixedly arranged on the panel 9 in a stationary position, and a drum half 17 which is coaxial to the first drum half and can be rotationally driven. Two magnetic heads 18 and 19 arranged diametrically to each other on the driven half 17, and pass through a gap formed between the two drum halves. The magnetic heads 18 and 19 serve to record and reproduce television signals in and from so-called oblique tracks, respectively, on the magnetic tape. The tape is wrapped along a helical path over a given angular range around the outer surface of the scanning device 15. The axis 20 of the scanning device 15 is inclined in the direction of the arrow 21 with respect to the instrument panel 9, so that the helical travel path of the magnetic tape around the scanning device is maintained in known manner.

For recording and reproducing sound signals associated with the television signals, the apparatus 1 has a fixedly arranged recording/reproducing magnetic head 22; and for erasing sound signals, a fixedly arranged erasing magnetic head 23. The useful gaps of these two magnetic heads 22 and 23 extend at right angles to the panel 9. For simultaneously erasing all the signals recorded on the magnetic tape, the apparatus has a further fixedly arranged erasing magnetic head 24, whose useful gap, adapted to the travel path of the magnetic tape section immediately adjacent the scanning device 15 and extending freely to the magnetic head 24, is inclined in the direction of the arrow 25 with respect to the panel 9. When the magnetic tape 3 drawn out of the cassette 2 is wrapped around the drum-shaped scanning device 15, the magnetic tape is also brought into scanning connection with the magnetic heads 22, 23 and 24.

For driving the magnetic tape 3 at a constant given speed of movement, the apparatus 1 has a driving capstan or shaft 26 which is aligned perpendicularly to the panel 9 and is driven by a motor. The magnetic tape is against the capstan, by a pressure roller 28, which can be displaced in a manner not shown and can be pivoted about a pivot point 27.

Figure 4:
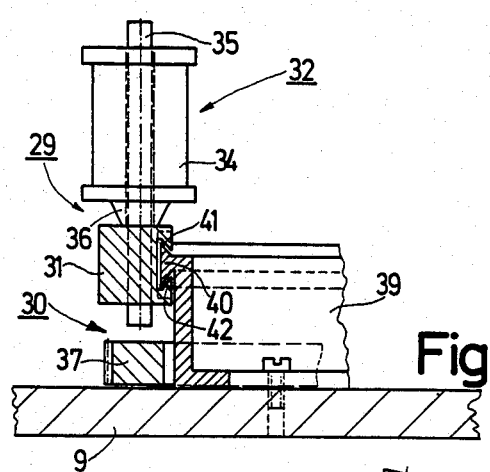
FIG. 4 is a sectional view taken on the line IV—IV in FIG. 1, on a larger scale, of the tape guide device, its tape guides being in their rest position.
Figure 6:
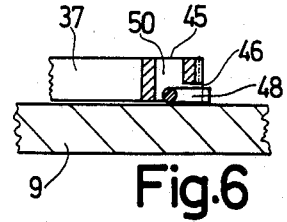
FIG. 6 is a sectional view of a detail of a displacement device of this apparatus for the tape guides taken on a line VI—VI in FIG. 5.
Figure 5:
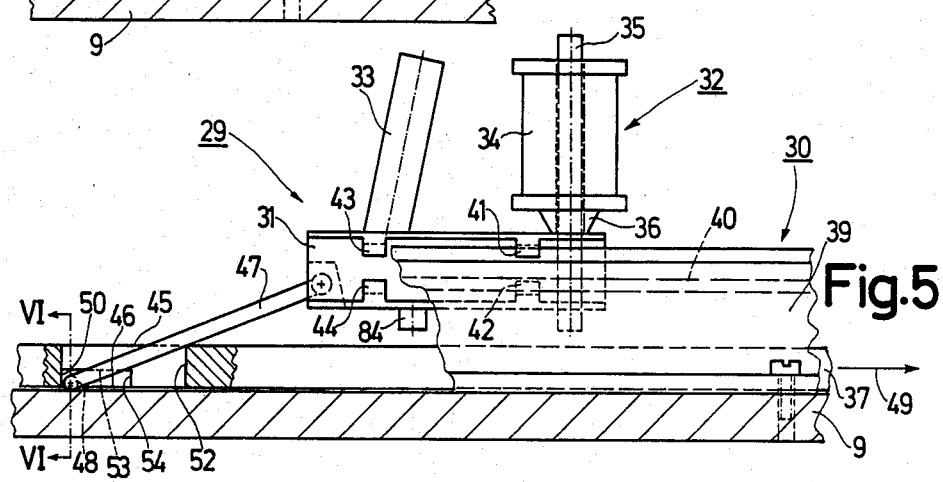
FIG. 5 is a larger scale side elevation, taken on the arrow V in FIG. 1, of the tape guide device, its tape guides being in their operating position.

The apparatus 1 is provided with a tape guide device 29 for drawing the magnetic tape 3 out of the cassette 2 and for wrapping this tape around the scanning device 15. The tape guide device has two tape guides 32 and 33 mounted on a holder block 31 which can be displaced between a rest position shown in FIG. 1 and an operating position shown in FIG. 2 by means of a displacement device 30. As appears in detail from FIGS. 4, 5 and 7, the tape guide 32 consists of a roller 34 which is provided with flanges and is rotatable about a shaft 35 having a lower end passing through the holder 31, an intermediate part 36 in the form of a truncated cone being placed on the shaft 35 between the roller 34 and the holder 31. The tape guide 33 is in the form of a pin which is inserted into the holder 31 and is inclined with respect to the tape guide 32.

The displacement device 30 for the tape guides 32 and 33 has a ring 37 for displacing the holder 31 for the two tape guides 32 and 33. The ring is rotatably pivoted on the panel 9 about the scanning device 15 in a manner not shown. For driving the ring 37, the latter is provided at its outer face with a gear, which is engaged by a driving gear wheel 38 that can be driven by a motor not shown. The motor is automatically switched off after the tape guides have reached their rest position and their operating position, respectively, as is known, for example, from Austrian Pat. No. 373,429 which describes another displacement device for displacing tape guides. The displacement device 30 further has an arcuate guide 39 coaxial to the ring 37 for guiding the holder 31 during its displacement. The guide 39 extends at the area of its end located more closely to the cassette parallel to the panel 9, as appears from FIGS. 4 and 5, and has towards its other end a path ascending away from the panel 9, as appears from FIG. 7. The guide 39 is provided with a dovetail-shaped guiding rim 40, on which the holder 31 is slidably arranged, four guide noses 41, 42, 43 and 44 provided on the holder engaging the guiding rim 40 and thus keeping the holder 31 in a position so as to be displaceable along this rim, as appears from FIGS. 4, 5 and 7.

The ring 37 is provided with a slot 45 to the panel 9, and from this a further radially-extending groove 46 leads to the outer face of the ring. The groove 46 is also open towards the instrument panel 9. A sliding rod 47 is pivotably connected through a ball-and-socket joint to the holder 31 and has an angular free end 48, which projects into the slot 45 and which is passed through the groove 46. Upon rotation of the ring 37 in the direction of the arrow 49 for displacing the tape guides 32 and 33 and the holder 31 to their operating position, the angular free end 48 of the sliding rod 47 engages the boundary wall 50 of the slot 45 and groove 46. The ring 37 and the free end 48 is slidably supported by the instrument panel 9, the driven ring 37 displacing the tape guides 32 and 33 provided on the holder 31 to their operating position via the sliding rod 47.

Figure 7:
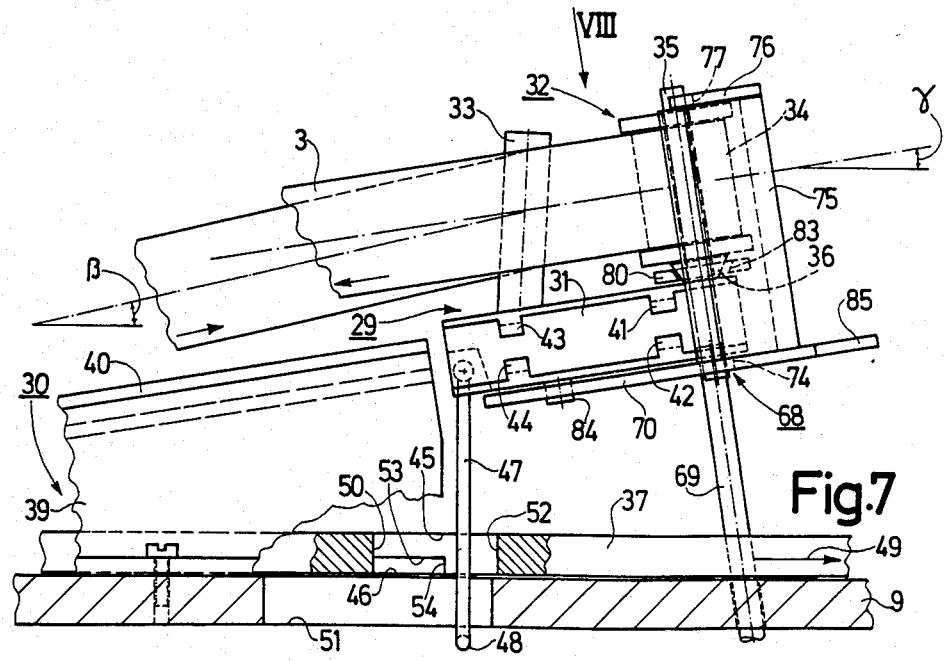
FIG. 7 is a larger scale side elevation, in the direction of the arrow VII in FIG. 2, of the tape guide device, its tape guides now being in their operating position and being positioned by the positioning device.

The displacement device 30 for the tape guides 32 and 33 can be disengaged from the tape guides when the latter are in their operating position, as shown in FIG. 7. For disengaging the displacement device from the tape guides, first the holder 31 for the tape guides is moved out of sliding engagement with the guide 39. This is achieved in that the holder 31 is displaced downwards by and then is moved beyond the end of the guiding rim 40. The holder is then being held on a positioning device for the tape guides, which will be described in detail hereinafter. Next, the driving connection between the ring 37 and the sliding rod 47 is disengaged. For this purpose, the instrument panel 9 has an opening 51, which the slot 45 and groove 46 partly overlap when the ring 37 and tape guides are in their operating position. The free end 48 of the sliding rod 47, which was slidably supported on the instrument panel 9, is automatically brought into a position above the opening 51 upon displacement of the ring 37 to its operating position in the direction of the arrow 49 a short time after the tape guides have reached their operating position. After the tape guides are in their operating position, the sliding rod 47 then passes through the slot 45 and opening 51 in their overlapping range so as to be freely movable. The sliding rod 47 then no longer has a connection with the ring 37 and with the instrument panel 9. Thus, without the use of separate means an automatic disengagement of the displacement device 30 from the tape guides 32 and 33 is obtained.

Upon rotation of the ring 37 against the direction of the arrow 49, in order to displace the tape guides 32 and 33 from their operating position, the boundary wall 52 of the slot 45 abuts against the sliding rod 47, as a result of which the latter is pivoted out of the opening 51 in the instrument panel 9 and the angular free end 48 of the sliding rod 47 is pivoted into the groove 46 in the ring 37. Upon further rotation of the ring 37, the angular free end 48 engages the boundary walls 53 and 54 of the groove 46, these walls now constituting an abutment for this end. Movement of the ring 37 now detaches the holder 31 from the positioning device, as will be described hereinafter, and slips it onto the guiding rim 40. Thus, without the use of separate parts, an automatic coupling of the displacement device 30 with the tape guides 32 and 33 is also obtained, and the ring 37 can then, via the sliding rod 47, pull the tape guides 32 and 33 and the holder 31 out of their operating position and along the guide 39 into their rest position.

In the rest position of the tape guides 32 and 33 shown in FIG. 1, these guides are in a position to engage the magnetic tape 3 accomodated in the cassette 2. When the ring 37 is driven in the direction of the arrow 49, the holder 31 is displaced by the sliding rod 47 along the guiding rim 40 of the guide 39, the tape guides 32 and 33 being displaced to their operating position, in which the magnetic tape taken along by the tape guides upon their displacement is kept wrapped around the scanning device 15. During this displacement of the tape guides 32 and 33 to their operating position, a further tape guide 55 is displaced in a manner (not shown) by the ring 37 from a rest position shown in FIG. 1, in which the magnetic tape in the cassette is engaged, to an operating position shown in FIG. 2, in which it keeps the magnetic tape at a sufficient distance from the scanning device 15. Furthermore, upon displacement of the tape guides 32 and 33 to their operating position, two tape guides 58 and 59, each pivotable about a pivot point 56 and 57, respectively, are displaced in a manner not shown from a rest position shown in FIG. 1, in which the magnetic tape in the cassette can be engaged, to an operating position shown in FIG. 2, in which the tape guide 58 keeps the magnetic tape at a sufficient distance from the scanning device 15 and the tape guide 59 keeps the magnetic tape wrapped around the capstan 26. It should be noted that, when the tape guide 55 is in its operating position, its axis is inclined in the direction of the arrow 60 with respect to the instrument panel 9; that, when the tape guide 32 is in its operating position, its axis is inclined in the direction of the arrow 61 with respect to the instrument panel 9; and that, when the tape guide 33 is in its operating position, its axis is inclined in the direction of the arrow 62 with respect to the instrument panel 9.

Figure 3:
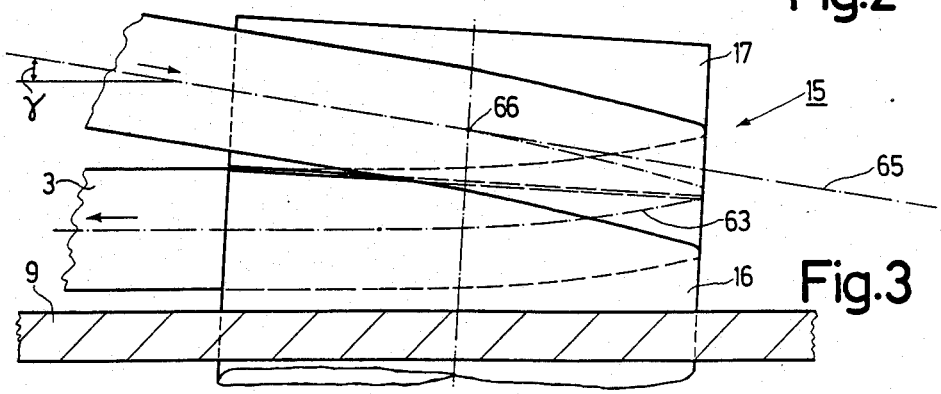
FIG. 3 is a diagrammatic side elevation on a larger scale than FIG. 2, taken on the arrow III in FIG. 2, of a drum-shaped scanning device of the apparatus shown in FIGS. 1 and 2 with magnetic tape wrapped around it.

Due to the inclined arrangement of the scanning device 15 and of the tape guides 55, 33 and 32 and of the magnetic head 24 with respect to the instrument panel 9, the following transport path of the magnetic tape kept wrapped by the tape guides 32 and 33 around the scanning device 15 is obtained, reference being made to FIGS. 2, 3 and 7. The magnetic tape section extending from the tape reel 4 over the tape guide 58 to the tape guide 55 has a longitudinal plane of symmetry extending parallel to the instrument panel 9. Due to the inclination of the tape guide 55, the magnetic tape is guided so that the longitudinal plane of symmetry of the magnetic tape section extending between the tape guide 55 and the tape guide 33 encloses an angle $\beta$ with the instrument panel 9, as shown in FIG. 7. Due to the inclination of the tape guide 33, the magnetic tape is guided so that the longitudinal plane of symmetry of the magnetic tape section extending from the tape guide 33 over the tape guide 32 and the magnetic head 24 to the scanning device 15 encloses an angle $\gamma$ with the instrument panel 9, which is smaller than the aforementioned angle $\beta$, as shown in FIG. 7. The magnetic tape extends around the scanning device 15 with its tape center line in a helical path 63, as shown in FIG. 3. Due to the inclination of the scanning device 15, this path 63 is chosen so that the magnetic tape section extending from the scanning device over a further tape guide 64, the two magnetic heads 23 and 22 and the tape guide 59 to the tape reel 7, again has a longitudinal plane of symmetry extending parallel to the instrument panel 9. The longitudinal plane of symmetry of the magnetic tape section extending from the tape guide 33 over the tape guide 32 and the magnetic head 24 to the scanning device 15 corresponds to any plane which is constituted by the tangent 65 to the helical path 63 described by the tape center line in the terminal point 66 of the angular range $\alpha$ wrapped by the magnetic tape facing the tape guide 32 and the radius vector 67 from the axis 20 of the scanning device 15 to this terminal point 66. It should be noted that the longitudinal plane of symmetry of a magnetic tape section continuously passes through the tape center line, while the magnetic tape can extend along a completely flat path, but also along a twisted path, as is the case with the use of conical tape guides.

For perfect recording and reproducing signals it is of important that the travel path of the magnetic tape described above is maintained accurately and in a continuously reproducible manner. To guarantee this, the two tape guides 32 and 33 in their operating position are positioned accurately in their spatial position. For this purpose, the apparatus 1 has a positioning device 68, which will be described hereinafter with reference to FIGS. 7, 8, 9 and 10. The positioning device 68 is arranged on a support formed as a supporting plate 70 which is pivotable about a shaft 69 inserted into the instrument panel 9, which supporting plate is subjected to the force of a tensile spring 71 engaging it. The shaft 69 of the supporting plate 70 is inclined in the direction of the arrow 72 with respect to the instrument panel 9, as is indicated in FIGS. 1 and 2. The inclination of the shaft 69 is chosen so that the pivotal movement of the supporting plate 70 about the shaft 69 takes place parallel to the longitudinal plane of symmetry of the freely extending magnetic tape section immediately adjacent the scanning device 15, this longitudinal plane of symmetry enclosing the angle $\gamma$ with the instrument panel 9, as is indicated in FIGS. 3 and 7.

The supporting plate 70 has an arcuate positioning slot 73 which is open at one end and which at its closed end terminates in a V-shaped positioning notch 74, which, when the tape guides 32 and 33 are in their operating position, cooperates with the end of the shaft 35 for the tape guide roller 34 passing through the holder 31. A bracket 75 in the form of a collar projects in the direction of the shaft 69, and has at its free end a positioning plate 76 which is aligned parallel to the supporting plate 70. The plate 76 has a V-shaped positioning notch 77 which is aligned to the positioning notch 74 in the direction of the shaft 69. When the tape guides are in their operating position, the notch 74 cooperates with the free end of the shaft 35 for the tape guide roller 34 passing through this roller, as appears from FIG. 7. The two positioning notches 74 and 77 form part of the positioning device 68 and define the inclined position of the tape guides, the shaft 35 of the tape guide 32 being at right angles to the longitudinal plane of symmetry of the freely extending magnetic tape section immediately adjacent the scanning device 15. This longitudinal plane of symmetry is the one which encloses the angle γ with the instrument panel 9.

Figure 8:
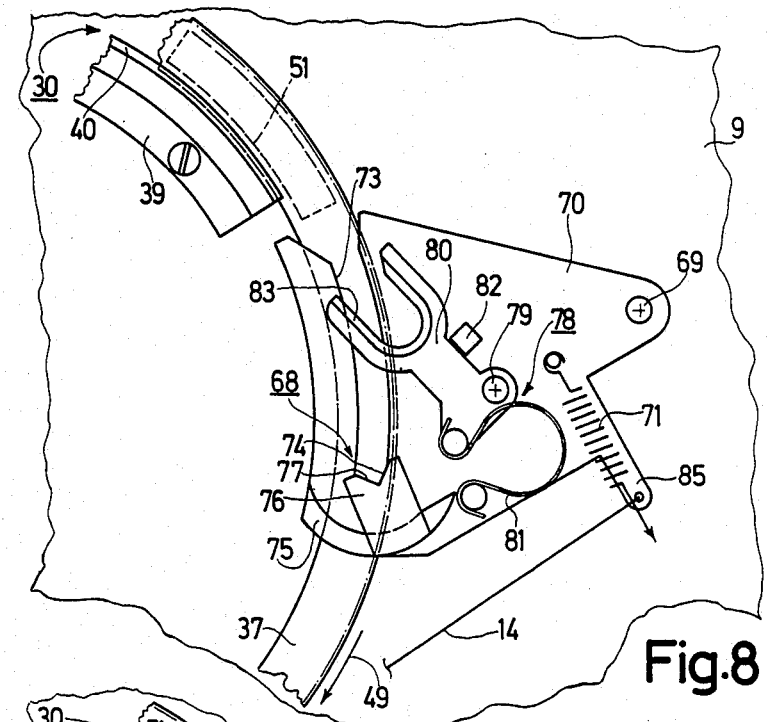
FIG. 8 is a plan view taken on the arrow VIII in FIG. 7 of the positioning device for the tape guides arranged on the supporting plate, the tape guides not being in their operating position, however.
Figure 9:
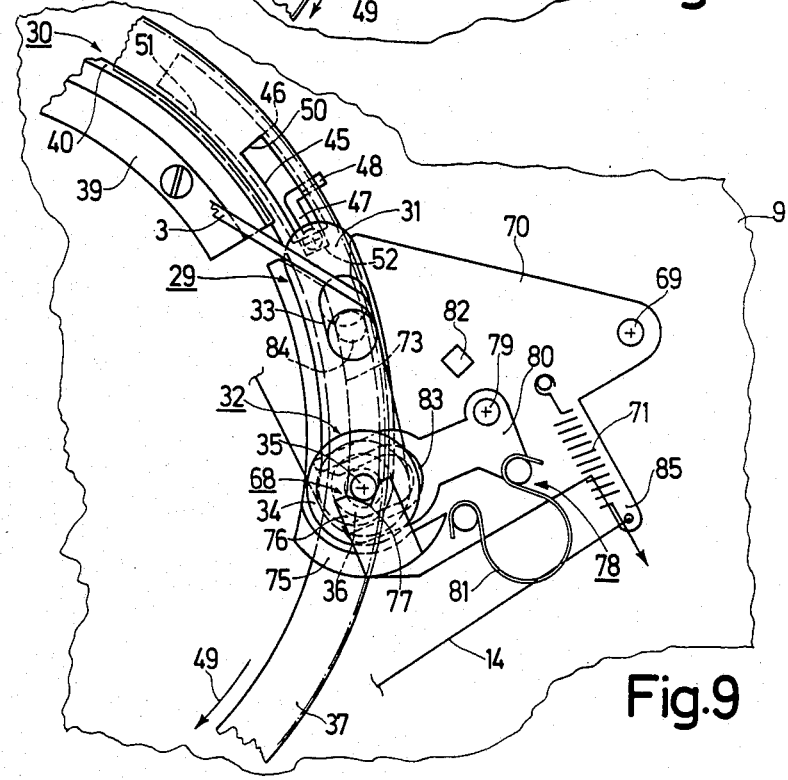
FIG. 9 shows in the same manner as FIG. 8 in plan view the positioning device for the tape guides provided on the supporting plate, the tape guides being in their operating position.
Figure 10:
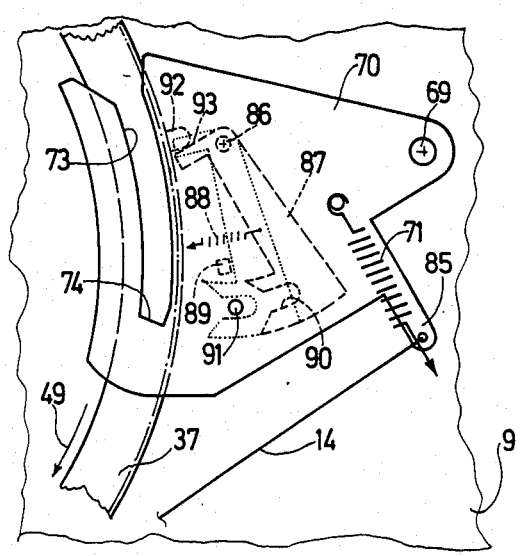
FIG. 10 shows in the same manner as FIGS. 8 and 9 in plan view the supporting plate for the positioning device represented only by its contours and an adjustable locking device for the supporting plate.

An urging device for urging the tape guides in their operating position against the positioning device 68 is provided on the supporting plate 70 so as to be displaceable with respect to this plate between a disengaged position shown in FIG. 8 and an urged position shown in FIG. 9. The urging device is constituted by an over-center lever arrangement 78 which can be automatically adjusted to its urged position by the intermediate part 36 upon displacement of the tape guides to their operating position, and is automatically adjusted by the intermediate part 36 to its disengaged position upon displacement of the tape guides from their operating position. The urging device or arrangement 78 has a pressure lever 80 which can be pivoted about a shaft 79 inserted into the supporting plate 70 and which is engaged by a Ω-shaped wire spring 81 bearing on the supporting plate 70. The wire spring 81 keeps the pressure lever 80 in its disengaged position shown in FIG. 8 urged against an abutment 82 formed on the supporting plate 70. The pressure lever 80 has at its free end a U-shaped recess 83, whose boundary wall is bevelled.

Upon displacement of the tape guides to their operating position by means of the displacement device 30, during which operation the lower end of the shaft 35 of the tape guide roller 34 passes into the open-ended positioning slot 73 in the supporting plate 70, the intermediate part 36 in the form of a truncated cone situated on the shaft 35 penetrates into the recess 83 in the pressure lever 80, as a result of which, upon further displacement of the tape guides by means of the displacement device 30, the pressure lever 80 is also displaced. The lever 80 is then pivoted over such a distance that it passes its dead center position, which is reached when the shaft 79 and the two engagement points of the wire spring 81 are located on a straight line. As soon as the pressure lever 80 has passed its dead center position, it is pivoted further by the force of the wire spring 81, and via the intermediate part 36 it moves the tape guide 32 as well as the holder 31 and the tape guide 33 also provided on this holder. Thus, the pressure lever 80 is displaced to its urged position shown in FIG. 9, in which under the force of the wire spring 81 lever 80 presses the bevelled boundary wall of its recess 83 on the intermediate part 36, as shown in FIG. 7. As a result, two force components are exerted on the intermediate part 36 by the bevelled boundary wall of the recess 83, one of these components acting at right angles to the shaft 35 and one component acting in the direction of the shaft 35. By the component acting at right angles to the shaft 35, the two free ends of the shaft are urged against the positioning notches 74 and 77, as a result of which the spatial inclined position of the tape guides is accurately defined. By the component acting in the direction of the flange of the shaft, the tape guide roller facing the plate 76 against the underside of this plate, as a result of which the spatial height position of the tape guides is accurately defined. The plate 76 thus also forms part of the positioning device 68.

As stated, the pressure lever 80, after having passed its dead center position, also displaces the holder 31 carrying the tape guides, as a result of which the holder is pulled past the guiding rim 40 and the sliding rod 47 is brought into the position in which it passes the slot 45 and opening 51 so as to be freely movable, as shown in FIG. 7. Upon this displacement of the holder 31, besides the end of the shaft 35 passing through the holder, a positioning pin 84 projecting from the holder passes into the open-ended positioning slot 73, as a result of which also the position of the holder 31, when the tape guides are in their operating position, is accurately defined. Thus, the position of the second tape guide 33 provided on the holder is therefore also accurately spatially defined. The positioning slot 73 consequently also forms part of the positioning device 68, which is provided for defining the position of the holder 31 and of the second tape guide 33 provided on the holder.

In order to displace the tape guides from their operating position by rotation of the ring 37 against the direction of the arrow 49, first the sliding rod 47 is coupled with the ring 37, as already described above, after which the holder 31 is pulled away from the supporting plate 70. The pressure lever 80 is then pivoted by the intermediate part 36 from its urged position. After having passed its dead position, the lever 80 returns by the force of the wire spring 81 to its disengaged position and contributes to the displacement of the holder 31 onto the guiding rim 40. The holder is then pulled back again along the guide 39 into its starting position corresponding to the rest position of the tape guides.

The supporting plate 70 has an arm 85 which projects laterally of this plate and has a free end to which one end of the braking tape 14 of the tape tension adjustment device 12 is secured. The other end of the braking tape 14 is held in a fixed position. The supporting plate 70 thus constitutes the tape tension indicator of the tape tension adjustment device 12. The plate 70 is arranged so as to be displaceable under the tape tension exerted by the magnetic tape on the tape guides when they are in their operating position urged against the positioning device 68 on the supporting plate 70, against the force of the tensile spring 71 which engages the supporting plate parallel to the longitudinal plane of symmetry of the freely extending magnetic tape section immediately adjacent the scanning device 15. When the tape tension of the magnetic tape increases, the supporting plate 70 is pivoted against the force of the spring 71. Due to this pivotal movement, the end of the braking tape 14 connected to the supporting plate 70 is displaced in a manner such that the braking tape tension is relieved and consequently the braking action of the braking tape on the braking disk 13 is reduced, which in turn leads to a reduction of the magnetic tape tension. When the tape tension of the magnetic tape decreases, the braking action of the braking tape on the braking disk is correspondingly increased, which leads to an increase of the magnetic tape tension. Thus, fluctuations of the tape tension during the operation of driving the magnetic tape wrapped around the scanning device in the direction from the first tape reel 4 to the second tape reel 7 can be neutralized, so that a substantially constant tape tension of the magnetic tape is always attained. The operation of the tape tension indicator in the present case is based on a purely mechanical principle.

It is desirable that the supporting plate 70 be held, when the tape guides are displaced from their operating position, in a position in which the braking tape is released with respect to the braking disk 13 and therefore does not exert any braking action on the braking disk, as is shown in FIG. 1. Thus, it is achieved that the magnetic tape remaining within the cassette can be rewound in a rewinding operation between the tape reels 4 and 7 without the braking tape exerting a braking action (which is disturbing in this case) on the braking disk and hence on the winding mandrel coaxial to this disk. In order to hold the supporting plate 70 in this given position, the apparatus 1 has, as appears from FIG. 10, a locking lever 87, which is pivotable about a shaft 86 inserted into the instrument panel 9 and which can be displaced between a locked position indicated in FIG. 10 by dotted lines and a disengaged position shown in FIG. 10 by broken lines. The locking lever 87 is engaged by a tensile spring 88, which in its locked position keeps the lever 87 urged against an abutment 89 fixed on the instrument panel 9. The locking lever 87 has a U-shaped recess 90, into which, when the locking lever is in its locked position, a locking pin 91 projecting from the supporting plate 70 is passed, as any result of which a pivotal movement of the supporting plate 70, which takes place substantially at right angles to the longitudinal direction of the U-shaped recess, is prevented. In order to bring the locking lever 87 into its disengaged position and to hold it in this position, the ring 37 of the displacement device 30 has a protrusion 92 which projects radially and which, when the tape guides are in their operating position, abuts on arm 93 of the lever 87 to position the locking lever 87 in its disengaged position in which the locking pin 91 is situated outside the U-shaped recess 90 in the locking lever 87. Upon displacement of the tape guides from their operating position, the protrusion 92 projecting from the ring releases the arm 93 of the locking lever 87, and the locking lever 87 returns to its position under the force of the tensile spring 88. The locking pin 91 on the supporting plate 70 is passed into the U-shaped recess 90 independently of the instantaneous position of the supporting plate 70, which is attained by a wedge-shaped widening of the mouth of the recess 90.

In the apparatus described above, the tape guides provided for wrapping the magnetic tape around the drum-shaped scanning device are utilized to detect the tape tension of the magnetic tape kept wrapped around the scanning device, the supporting plate for the positioning device for positioning the tape guides constituting at the same time the tape tension indicator of the tape tension adjustment device, as a result of which a simple and inexpensive construction is obtained. The tape tension at the area of the scanning device is advantageously determined by means of the tape guides arranged in their operating position in the immediate proximity of the scanning device, because the tape tension adjustment device then adjusts in fact the tape tension at the area of the scanning device, which is important with a view to a perfect scanning of the oblique tracks on the magnetic tape by means of the scanning device. The tape guides utilized to detect the tape tension are wrapped by the magnetic tape in a comparatively large wrapping range, thereby providing a high sensitivity of the tape tension indicator. Since the displacement of the supporting plate constituting the tape tension indicator is effected during the tape tension adjustment parallel to the longitudinal plane of symmetry of the freely extending magnetic tape section immediately adjacent the scanning device, it is advantageously attained that in spite of the resulting displacing movement of the tape guides the travel path of the magnetic tape remains unchanged in level with respect to the scanning device. The magnetic head fixedly arranged between the scanning device and the tape guides utilized for the tape tension detection ensures that, independently of the displacing movements of the tape guides during the tape tension adjustment, also the wrapping range of the magnetic tape around the scanning device remains constant. Due to the disengagement of the displacement device from the tape guides situated in their operating position and utilized for tape tension detection, it is achieved that also small tape tension fluctuations are detected without hindrance by the tape guides.

Figure 11:
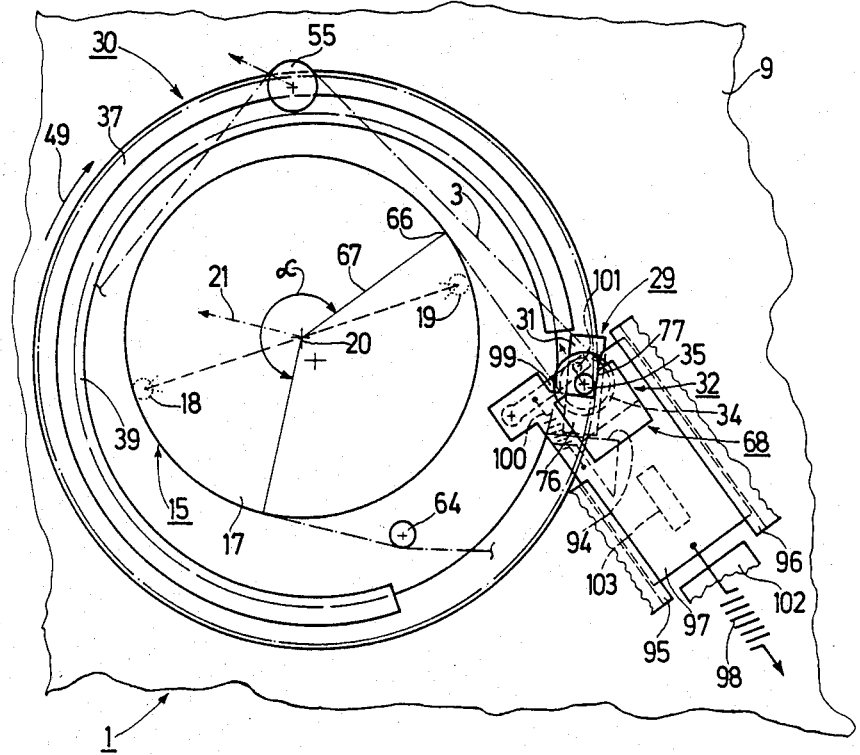
FIG. 11 shows diagrammatically in plan view the parts essential to the invention of a magnetic tape recording and/or reproducing apparatus for television signals in a second embodiment, in which the positioning device for a tape guide of a tape guide device is arranged on a slide constituting an electromagnetic tape tension indicator.

In the apparatus 1 shown in FIG. 11, a tape guide device 29 for drawing the magnetic tape 3 out of the cassette not shown here and for wrapping this tape around a drum-shaped scanning device 15 has only one tape guide 32 constructed as a roller provided with flanges. The tape guide 32 is provided on a block-shaped holder 31, which is displaceably guided along a guide 39 and which is displaceable via a sliding rod not shown by means of a drivable ring 37 of a displacement device 30. For positioning the tape guide 32 in its operating position, the tape guide is then disengaged from the displacement device 30. A position device 68 is provided, which also has two positioning notches 74 and 77 aligned in the direction of the shaft 35 of the tape guide 32, and an abutment surface 94 for positioning the holder 31 disengaged from the displacement device 30.

The support for the positioning device 68 is constituted in this apparatus by a slide 97 guided slidably in two rectilinear guides 95 and 96. The slide is guided by the guides 95 and 96 parallel to the longitudinal plane of symmetry of the freely extending magnetic tape section immediately adjacent the scanning device. This section extends in the present case freely from the scanning device 15 to the tape guide 32 situated in its operating position, so as to be displaceable in the longitudinal direction of this freely extending magnetic tape section. Thus, it is achieved that in spite of the displacing movement of the tape guide during the tape tension adjustment without the use of separate tape guides, the wrapping range of the magnetic tape around the scanning device continuously remains unchanged. The slide 97 is engaged by a spring 98, which counteracts the tape tension exerted on the tape guide 32 kept urged against the positioning device on the slide.

For urging the tape guide 32 against the positioning device 68, in this apparatus the slide 97 is provided with a pivotable pressure lever 99, which is subjected to the force of a spring 100 pulling this lever into its urged position shown in FIG. 11. The pressure lever 99 carries an adjustment pin 101 which projects from this lever to the ring 37 of the displacement device 30 and which cooperates with an adjustment device (not shown) provided on the ring 37, which, when the tape guide 32 is in its operating position, releases the adjustment pin 101 and, upon rotation of the ring against the direction of the arrow 49 in order to displace the tape guide from its shown operating position, displaces the adjustment pin 101 over such a distance that the pressure lever 99 pivots via this pin into its disengaged position and is also held therein by the adjustment device. After the tape guide 32 has been displaced from its operating position by a corresponding rotation of the ring against the direction of the arrow 49, due to the loss of the tape tension the slide 97 is pulled against an abutment 102 by the force of the spring 98.

The slide 97 carries a rod 103 of permanent magnetic or magnetizable material, which cooperates with a coil (not shown) through which current flows. Upon displacement of the slide 97 due to tape tension fluctuations, the relative position of the rod and the coil is varied, which leads to value variations in the current flowing through the coil. These value variations are processed in known manner in a tape tension adjustment device by an electronic adjustment circuit for a tape winding drive motor for adjusting the tape tension to a substantially constant value. In this embodiment, the operation of the tape tension indicator constituted by the slide is consequently based on an electromagnetic principle. When the slide, with a tape guide displaceable from its operating position, bears on the abutment 102, the tape tension adjustment device can be switched off by means of a switch actuated by the slide.

As a matter of course, the invention is not limited to the two embodiments described above. For example, the tape guide device may also comprise tape guides provided on two holders, which are positioned away from the cassette at substantially opposite sides of the scanning device each in one positioning device arranged on a displaceable support, at least one of these two supports constituting a tape tension indicator. For the construction of the tape tension indicators, the prior art offers a series of possibilities. Of course, also other displacement devices may be used, for example devices with toggle joint drives, chain member drives or rope drives. With respect to the urging device constructed as a dead centre lever arrangement, it should be noted that the latter may also be adjusted by the holder for the tape guides or by the ring of the displacement device. Of course, also other positioning devices may be used for the tape guides.

What is claimed is:

1. A helical scan cassette recorder, for use with a cassette accommodating a magnetic tape and having an opening from which tape can be drawn for scanning by the recorder, comprising a panel,
   a drum-shaped scanning device for the magnetic tape, mounted to said panel, and having an outer surface around which, during operation, magnetic tape drawn out of the cassette is wrapped over a given angular range,
   means, comprising a tape guide device, for drawing the magnetic tape out of a cassette and wrapping the tape around the scanning device; said means comprising at least one tape guide, a displacement device for displacing said at least one tape guide between a rest position and an operating position, and a holder to which the tape guide is secured, arranged such that in the rest position the tape guide engages behind the magnetic tape accommodated in the cassette adjacent to the cassette opening, and in the operating position the magnetic tape which was carried along by the tape guide during displacement, is kept wrapped around the scanning device,
   a positioning device for positioning the tape guide in its operating position, and a displaceable support on which the positioning device is arranged, and
   a tape tension adjustment device for adjusting tape tension when the magnetic tape wrapped around the scanning device is driven, comprising a tape tension indicator,
   characterized in that the displacement device for the tape guide includes a ring for displacing said holder, mounted for pivotal rotation about said scanning device; a guide coaxial to said ring for guiding the holder during its displacement; means for driving said ring pivotally about said scanning device; and a sliding rod pivotally connected to said holder and having a bent free end; and
   the displacement device is arranged such that, when the tape guide is in the operating position, the displacement device is disengaged from the tape guide,
   the recorder comprises a spring for biasing said displaceable support, and an urging device for urging the tape guide, when in the operating position, against the positioning device against the force of said spring; said urging device being provided on the support so as to be displaceable with respect to the support between a disengaged position and an urged position,
   said ring has a slot communicating with said panel, said angular free end engaging said slot during rotation of the ring so as to displace the tape guide towards its operating position,
   said panel has a slot aligned with said ring slot when the ring is in the operating position, such that said rod free end is slidably supported by the panel during rotation of the ring from the rest position, while when the ring is in the operating position said bent end is disengaged from the ring and enters the slot in the panel so as to be freely moveable within said slots; and upon rotation of the ring for displacing the tape guide from its operating position toward the rest position, said bent end is moved out of the slot of the panel, and engages an abutment on the ring for moving said holder away from said support, and
   the support constitutes the tape tension indicator, and is arranged so as to be displaceable substantially parallel to a longitudinal plane of symmetry of a freely extending magnetic tape section immediately adjacent to the scanning device under the tension exerted by the magnetic tape on the tape guide while situated in its operating position and urged against the positioning device on the support.

2. An apparatus as claimed in claim 1, characterized in that said urging device comprises a dead center lever arranged such that, upon displacement of the tape guide to said operating position, the dead center lever automatically pivots to an urged position; and upon displacement of the tape guide from its operating position, the lever is automatically adjusted to a disengaged position.

3. An apparatus as claimed in claim 1, characterized in that a freely extending section of magnetic tape immediately adjacent the scanning device extends to the tape guide when the guide is in its operating position urged against the positioning device on the support, and said support comprises a slide arranged to be displaceable in the longitudinal direction of said freely extending magnetic tape section.

4. A helical scan cassette recorder, for use with a cassette accommodating a magnetic tape and having an opening from which tape can be drawn for scanning by the recorder, comprising a panel, a drum-shaped scanning device for the magnetic tape, mounted to said panel, and having an outer surface around which, during operation, magnetic tape drawn out of the cassette is wrapped over a given angular range, means, comprising a tape guide device, for drawing the magnetic tape out of a cassette and wrapping the tape around the scanning device; said means comprising at least one tape guide, a displacement device for displacing said at least one tape guide between a rest position and an operating position, and a holder to which the tape guide is secured, arranged such that in the rest position the tape guide engages behind the magnetic tape accommodated in the cassette adjacent to the cassette opening, and in the operating position the magnetic tape which was carried along by the tape guide during displacement, is kept wrapped around the scanning device, a positioning device for positioning the tape guide in its operating position, and a displaceable support on which the positioning device is arranged, and a tape tension adjustment device for adjusting tape tension when the magnetic tape wrapped around the scanning device is driven, comprising a tape tension indicator, characterized in that the displacement device is arranged such that, when the tape guide is in the operating position, the displacement device is disengaged from the tape guide, the recorder comprises an urging device for urging the tape guide, when in the operating position, against the positioning device; said urging device being provided on the support so as to be displaceable with respect to the support between a disengaged position and an urged position, and the support constitutes the tape tension indicator, and is arranged so as to be displaceable substantially parallel to a longitudinal plane of symmetry of a freely extending magnetic tape section immediately adjacent to the scanning device under the tension exerted by the magnetic tape on the tape guide which situated in its operating position and urged against the positioning device on the support.

5. An apparatus as claimed in claim 4, characterized in that said urging device comprises a dead center lever arranged such that, upon displacement of the tape guide to said operating position, the dead center lever automatically pivots to an urged position; and upon displacement of the tape guide from its operating position, the lever is automatically adjusted to a disengaged position.

6. An apparatus as claimed in claim 5, characterized in that a freely extending section of magnetic tape immediately adjacent the scanning device extends to the tape guide when the guide is in its operating position urged against the positioning device on the support, and said support comprises a slide arranged to be displaceable in the longitudinal direction of said freely extending magnetic tape section.

7. An apparatus as claimed in claim 4, characterized in that a freely extending section of magnetic tape immediately adjacent the scanning device extends to the tape guide when the guide is in its operating position urged against the positioning device on the support, and said support comprises a slide arranged to be displaceable in the longitudinal direction of said freely extending magnetic tape section.

* * * * *